UNITED STATES PATENT OFFICE.

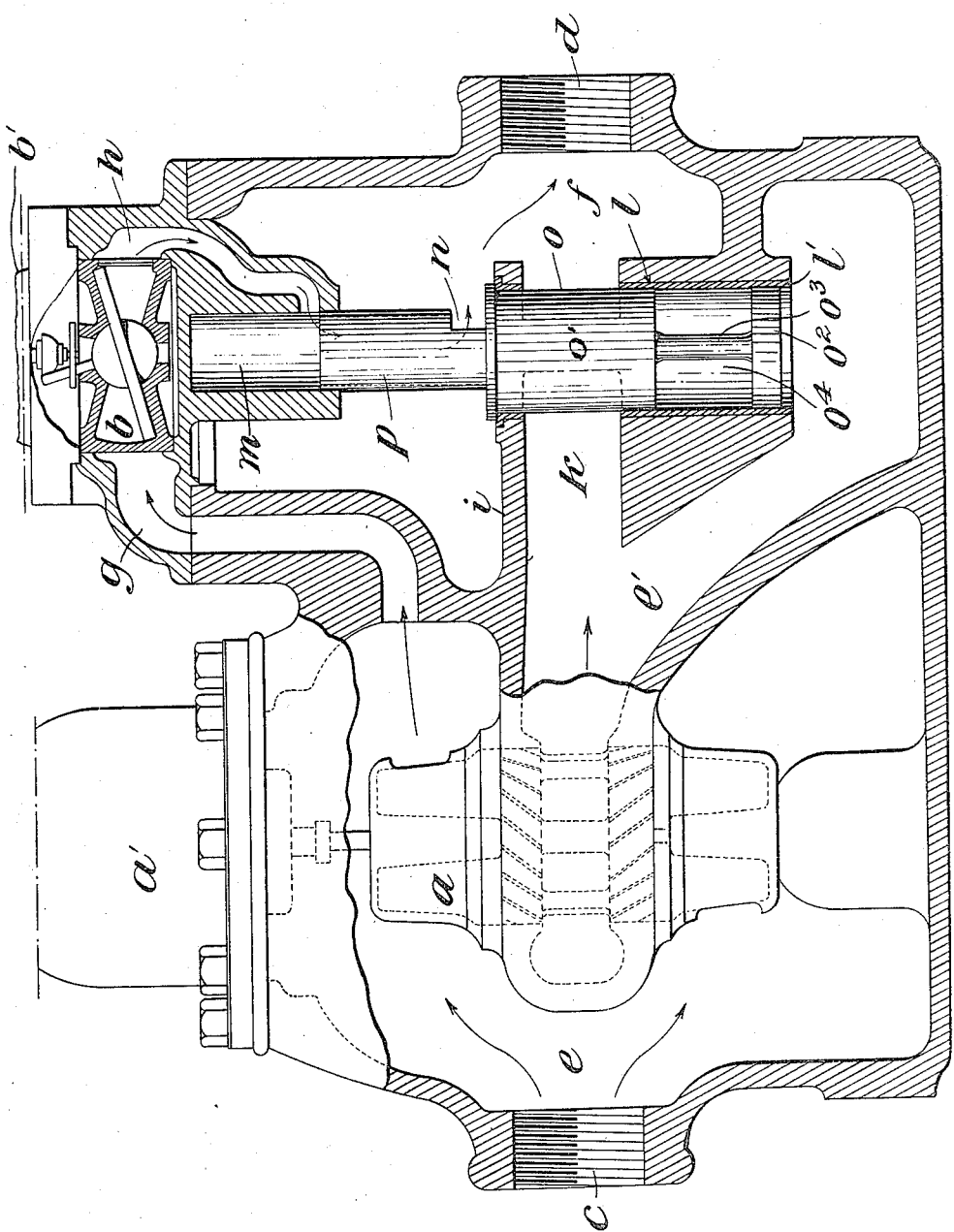

HENRY I. DILTS, OF NEW YORK, N. Y., ASSIGNOR TO NEPTUNE METER COMPANY, OF NEW YORK, N. Y., A CORPORATION OF NEW JERSEY.

WATER-METER.

966,319.  Specification of Letters Patent.  Patented Aug. 2, 1910.

Application filed March 18, 1910. Serial No. 550,258.

*To all whom it may concern:*

Be it known that I, HENRY I. DILTS, a citizen of the United States, and residing in Long Island City, of the borough of Queens, of the city of New York, in the State of New York, have invented certain new and useful Improvements in Water-Meters, of which the following is a specification, reference being had to the accompanying drawing, forming a part hereof.

The invention relates to compound water meters in which a high-duty metering device and a low-duty metering device are combined, a valve, operated by variations in the pressure differential, acting to permit the flow through one of such meters, and to prevent the flow through the other of such meters, and it is particularly concerned with the construction of the valve by which the flow through one meter or the other is determined. In the present case the valve body is so constructed and arranged as to permit a straight or nearly straight flow of the liquid from the high-duty metering device to the outlet when the flow is so great as to cause the valve, through the increase in the pressure differential, to open the high-duty passage or branch, thereby reducing the internal resistance of the meter.

The invention will be more fully explained hereinafter with reference to the accompanying drawing which presents a view, partly in elevation and partly in vertical section, of a compound meter which embodies the invention.

As in the structure represented in the drawing, the relatively high-duty metering device $a$ and the relatively low-duty metering device $b$, are preferably, although not necessarily, combined in a single structure. These metering devices, moreover, may be of any suitable character, the metering device $a$ being shown as of the turbine type, which is well adapted to register accurately large flows of liquid, while the metering device $b$ is of the nutating disk type, which is well adapted to register accurately small flows of liquid.

The metering devices are respectively provided, as usual, with registering mechanisms, as at $a'$ and $b'$. In the structure shown there is a common inlet or inflow opening for the liquid at $c$ and a common outlet or outflow at $d$. The liquid which enters at the inlet $c$ passes into a chamber $e$ from which, according to the position of the valve hereinafter referred to, it flows either through that branch of the common conduit which includes the high-duty metering device $a$ and the channel $e'$, into the chamber $f$, whence it escapes through the outlet $d$, or through that branch which includes the channel $g$, the low-duty metering device $b$ and the channel $h$, into the chamber $f$.

In the wall $i$ between the high-duty branch or channel $e'$ and the common outflow chamber $f$ is a channel or passage $k$, which communicates at one end with the high-duty channel $e'$ and at the other end with the common outflow chamber $f$, the channel being more or less directly in line with the high-duty meter and the outlet $d$, according to convenience in manufacture, so that when the flow is through the high-duty branch the internal resistance is much less than is the case when the direction of flow is materially changed. In the wall $i$ is also formed a cylindrical chamber $l$ which intersects the channel $k$, such chamber being in open communication at its lower end with the high-duty channel $e'$. If desired, a lining $l'$ may be provided for the chamber as shown. The channel $h$ from the low-duty meter terminates in a chamber $m$.

In the chamber $l$ is disposed a valve body $o$, the upper part $o'$ of which is cylindrical or otherwise conforms to the cross section of the chamber, so that when the valve body is in its lowest position, as shown in the drawing, it cuts off the channel $k$ and prevents the flow of liquid from the channel $e'$ to the outflow chamber $f$, while the lower part of the valve body is spool-shaped as shown, having a head $o^2$ at its lower end connected by a stem or spindle $o^3$ with the cylindrical or solid part $o'$, so that when the valve body is raised by an increased pressure against the underside of the lower head $o^2$, the chamber $o^4$ about the spindle $o^3$ and between the head $o^2$ and the upper part $o'$, will register with the channel $k$ and will permit direct flow of the liquid through such channel, without compelling the liquid to follow a more circuitous path as would be the case if the liquid were compelled to pass up through the chamber $l$. The channel $h$ is controlled by a valve body $p$. The two valve bodies $o$ and $p$ are fixedly united, as by being made integral or otherwise, and are arranged to work vertically. In the construction shown the valve body *p* is tubular and is provided with a lateral port *n* which opens into the chamber *f*.

When the flow of liquid is small the pressure differential between the inlet and the outlet is small and is insufficient to overcome the weight of the valve *o*, *p*. The valve therefore stands in its lowest position, as shown in the drawing, closing the passage *k* and opening the end of the channel *h* in the chamber *m* so that flow through the low-duty meter is permitted and flow through the high-duty meter is prevented. When, however, the flow is large, then the pressure differential increases and is sufficient to cause the valve *o*, *p*, to be raised, through the pressure on the underside of the head $o^2$, opening the passage *k* so as to permit the flow of liquid through the high-duty meter, and closing the end of the channel *h* so as to prevent the flow of liquid through the low-duty meter.

I claim as my invention:

The combination of a relatively high-duty meter, a relatively low-duty meter, a common conduit having branches in which the two meters are respectively located, the inflow and the outflow being common to both branches, a wall between the high-duty branch and the common outflow chamber, said wall having formed therein a substantially vertical cylindrical chamber in open communication at its lower end with the high-duty branch and also having formed therein a channel communicating at one end with the high-duty branch and at the other end with the common outflow chamber and intersecting the chamber, a valve body in said chamber having a solid upper part and a lower head and having a chamber or channel between the upper part and its lower head and a valve body connected with the last named valve body to control the low-duty branch, whereby when the pressure differential is low the low-duty branch is open and the channel from the high-duty branch to the common outflow chamber is closed by the solid upper part of the first named valve body, and when the pressure differential is high the valve is raised, through the pressure against its lower head, to cause the chamber or channel in the lower part of the valve to register with the channel from the high-duty branch to the common outflow chamber, to permit flow through the high-duty branch, and the low-duty branch is closed.

This specification signed and witnessed this 11th day of March, A. D. 1910.

HENRY I. DILTS.

Signed in the presence of—
ELLA J. KRUGER,
AMBROSE L. O'SHEA.